United States Patent
Kisters

(10) Patent No.: US 7,447,910 B2
(45) Date of Patent: Nov. 4, 2008

(54) METHOD, ARRANGEMENT AND SECURE MEDIUM FOR AUTHENTICATION OF A USER

(75) Inventor: Friedrich Kisters, Kreuzlingen (CH)

(73) Assignee: Human Bios GmbH, Kreuzlingen (CH)

( * ) Notice: Subject to any disclaimer, the term of this patent is extended or adjusted under 35 U.S.C. 154(b) by 714 days.

(21) Appl. No.: 10/467,508

(22) PCT Filed: Feb. 7, 2002

(86) PCT No.: PCT/CH02/00072

§ 371 (c)(1),
(2), (4) Date: Nov. 26, 2003

(87) PCT Pub. No.: WO02/065253

PCT Pub. Date: Aug. 22, 2002

(65) Prior Publication Data

US 2004/0107367 A1 Jun. 3, 2004

(30) Foreign Application Priority Data

Feb. 9, 2001 (EP) .................................. 01810138

(51) Int. Cl.
*H04K 1/00* (2006.01)
(52) U.S. Cl. ..................... 713/186; 713/186; 713/182
(58) Field of Classification Search ................. 713/186, 713/182
See application file for complete search history.

(56) References Cited

U.S. PATENT DOCUMENTS 5,995,965 A * 11/1999 Experton ..................... 707/10
6,044,349 A * 3/2000 Tolopka et al. ................. 705/1

FOREIGN PATENT DOCUMENTS

| DE | 37 36 190 | 5/1988 |
| EP | 0 715 242 | 6/1996 |
| EP | 1 004 992 | 5/2000 |
| GB | 2 329 497 | 3/1999 |

* cited by examiner

*Primary Examiner*—Nasser Moazzami
*Assistant Examiner*—Mohammad W Reza
(74) *Attorney, Agent, or Firm*—Jacox, Meckstroth & Jenkins

(57) ABSTRACT

When confidential data or areas of an EDP system (2) are accessed by a user (9), the user is granted access only if he registers (16) with the EDP system correctly with a user name and a password and, in addition, can identify himself as having access authorization using an access code (21), to which only he has access, from a database (5.2). The database is stored on a chip card (5), and access to the database has dual protection. Access to the access codes in the database is given only to that user who can correctly authenticate himself (12) to the chip card using biometric data, for example. In addition, the access codes in the database can be accessed only by a program (5.1) which is stored on the chip card and which can be activated only following correct authentication to the chip card by the user and which needs to have correctly authenticated itself (20) directly on the database using an ID incorporated in the program code.

13 Claims, 2 Drawing Sheets

METHOD, ARRANGEMENT AND SECURE MEDIUM FOR AUTHENTICATION OF A USER

BACKGROUND OF THE INVENTION

1. Technical Field

The invention relates to a method for authenticating a user for access to protected areas, where an access code is read from a database stored on a security medium and is transmitted to a data processing apparatus. The invention also relates to a corresponding arrangement and to a corresponding security medium for such access to a data processing apparatus.

2. Prior Art

As modern communication systems spread, the need to use these communication systems for applications which were originally not developed for such systems also increases. By way of example, goods purchases and sales or else legal and banking transactions are being handled more and more often over communication networks which are publicly accessible. One example of such a communication network is the Internet, which provides a simple, rapid and cost-effective way of communicating world-wide. However, communication over such networks is unprotected, in principle, i.e. can be monitored and even altered by anybody who has a little technical know-how and the right equipment.

There are various reasons in favor of protected communication, however. By way of example, when the information transmitted is not intended to be made accessible to the public, when it is necessary to ensure that the information arrives exactly in the form in which it was sent, or when the parties for a transaction are not known to one another and wish to check the identity of their opposite counterpart before transmitting confidential information. This applies particularly also to banking transactions such as "home or online banking", where a bank's customer manages his accounts himself over the Internet, i.e. checks account balances, makes payments or purchases shares, for example.

To authenticate a user who uses the Internet, for example, to register on his bank's homepage, various options have already been proposed. One option involves the user logging on by entering not only a user name and password but also the next particular access code from a scratchlist which is available in paper form and is known only to the user (and naturally to the bank). If the user's scratchlist is stolen, however, the thief can pretend to the bank that he is the new holder and can obtain unauthorized access to the user's accounts. Proposals have also already been made to store the scratchlist in electronic form, for example on a diskette. However, it can also be discovered by spying in this case too, for example by virtue of its being read by an unauthorized third party when the user is online. In addition, it is naturally also possible to get into the bank's EDP system and to obtain the information required in this manner.

Another option is to use a processor-assisted card with automatic generation of an access code by a small program which is executed in parallel both on the card and on the bank server. However, concurrent logging allows this program to be reconstructed and an access code subsequently generated independently to be put to misuse.

In other, known systems, "chip cards" are used which store biometric data for the user (for example fingerprints, data about the user's iris or about the user's voice) for identification purposes. In this case too, however, it is possible to use concurrent logging to obtain possession of these personal data and to feign the user's identity to the bank server when attempting to log on for misuse.

There is thus currently no system for securely authenticating a user when accessing confidential data over a public network such as the Internet.

DESCRIPTION OF THE INVENTION

It is an object of the invention to specify a method of the type mentioned initially which avoids the problems which exist in the prior art and, in particular, permits secure authentication of a user for access to protected areas.

In one aspect, this invention comprises a method for authenticating a user for access to protected areas, where an access code is read from a database stored on a security medium, particularly a chip card, and is transmitted to a data processing apparatus, characterized in that the user is authenticated before the access code is read, a mediator program, particularly a Java program, is started, a card program stored on the security medium is asked by the mediator program to read the access code, the mediator program is authenticated by the security medium, and, if the mediator program and the user have been correctly authenticated, the access code is read from the database by the card program, is transferred to the mediator program and is transmitted to the data processing apparatus by the mediator program. In line with the invention, authenticating a user for access to protected areas involves an access code being read from a database and being transmitted to a data processing apparatus. The data processing apparatus checks the user's identity and grants him access to the desired areas if he has been correctly authenticated.

The database is stored on a security medium, and access to the database is possible only for the previously authorized user, that is, the correct access code for transmission to the data processing apparatus can be read from the database only if authentication of the user has been carried out beforehand and the user has been correctly authenticated.

The code is read from the chip card database by starting an appropriate program, called mediator program below, and by the mediator program in turn starting a program stored on the chip card, called card program below, and asking this program to read a code from the database. To increase security further, the mediator program first needs to authenticate itself correctly on the chip card or with the card program before the card program can read a code from the database. By way of example, this is done by virtue of the chip card checking whether the mediator program is able to identify itself using an authorization code which the mediator program fetches from the data processing apparatus, for example, and which is also stored on the chip card or is calculated by the card program. Another option would be for such an authorization code to be recalculated whenever the chip card is accessed, for example on the basis of user data, the time, the number of access codes still available in the database, the latter's checksum, the user's digital signature, the user's public key or other information.

The mediator program is, by way of example, a Java program, which has the advantage that it is not necessary to give any consideration to the software and/or hardware platform used by the user.

Once both the user and the mediator program have been correctly authenticated, the card program reads the next code from the database and transfers it to the mediator program. The mediator program transmits the received code to the data processing apparatus, which performs a check on the code. If this check is successful, the user is permitted to access the protected areas. Otherwise, the user is refused access and an error message is displayed, for example.

The data and/or areas are, by way of example, confidential information stored in the data processing apparatus, with access to all the data or areas of the data processing apparatus also being able to be limited or controlled. Alternatively, they can be physical areas such as rooms or else countries which the user would like to enter, for example, in which case the security medium is a type of passport or key for entry.

The inventive method is a combination, a nest of a plurality of authentication methods. So that the user actually obtains possession of the correct access code, that is, is able to transmit said access code to the data processing apparatus, he first needs to identify himself correctly to the security medium.

It is therefore not sufficient for a potential attacker to monitor the insecure network, because a new access code is used whenever a connection is set up. It is not possible for the attacker to guess the next access code, because the access codes are generated beforehand by an algorithm for generating random numbers and are stored in the database on the security medium. Monitoring as these access codes are generated and reconstruction of the corresponding program are therefore not possible.

In addition, it is also not sufficient to purloin the security medium from the user, because only the user himself is able to authenticate himself correctly to the security medium and hence to enable access to the access codes stored in the database.

It is similarly impossible for the reading of an access code to be initiated using any program, since this requires a special mediator program which furthermore needs to authenticate itself with the card program. If this card program has been extracted from another card, the identification gives a negative result and access to the database on the card is prevented. This authentication incorporates a further obstacle which makes it additionally more difficult for the thief to read an access code, even if he were to succeed in correctly authenticating himself to the security medium.

Suitable security media which can be used are primarily apparatuses which have a memory for electronic data, a processor for processing such data and, if necessary, interfaces for communicating with the surroundings or with other devices. Since such security media need to be portable and hence also small and lightweight, chip cards are perfectly suitable for this purpose. For this reason, the term chip card is used in the majority of cases below without thereby excluding other security media.

To authenticate the user to the security medium, it is possible, in principle, to use any known method (for example on a software basis by entering a password or a PIN, or else on a hardware basis, for example by inserting and rotating a correct key or by inserting a dongle). Advantageously, however, a method is used in which the user's identity is checked using user-specific identification features. Such features include, by way of example, biometric data for the user such as a fingerprint, the frequency spectrum of his voice or the structure of his iris. Other biometric data are entirely conceivable.

The user's authentication is now checked by first, in conjunction with the production of the chip card, detecting user-specific identification features for the chip card holder and storing them in a suitable form in the memory on the chip card. When the chip card is used by the user, the same user-specific identification features are ascertained again and are compared with the identification features stored on the chip card. If these features match, the user has correctly authenticated himself and the chip card can be activated.

Instead of a single user, a user group whose members wish to access the confidential data may naturally also be involved. The method steps described above or below can easily be adapted to a plurality of users.

Once the chip card has been activated, the next access code, subsequently also called code, can be read from a database and transmitted to the data processing apparatus. When a company's own EDP systems are accessed, in which case the user and the data processing apparatus communicate exclusively via internal communication networks, such complex security precautions are admittedly not absolutely necessary, but they can nonetheless be useful. Preferably, however, the inventive method is used where the data processing apparatus is accessed over a public communication network, such as the Internet.

So that, where the type of data transmitted so requires, the confidentiality of the transmitted data is also ensured, the communication between the user and the data processing apparatus is encrypted. Internet pages are typically displayed using special programs, "browsers", which are stored on the device used by the user for Internet access and are executed thereon. Such browsers normally have in-built mechanisms for encrypting the communication between the user and the server in question. Encryption is performed using known encryption methods, for example using an asymmetrical encryption method such as the public key method, using a key or one or more corresponding key pairs comprising a public and a private key. To encrypt the communication using an asymmetrical method, the two communicating parties typically require one key pair each.

The user's key or keys are preferably stored on the chip card, where they can be read by the user or by his browser or computer and can be temporarily stored on the latter.

As already mentioned, the encryption itself is performed using one of the known asymmetrical encryption methods, for example. This involves the user encrypting the data he sends using one key, and decrypting received data using the other key. The same also applies to the data processing apparatus, which takes the corresponding keys from its database. At the user end, the keys are stored at a location provided for this purpose, for example on the user's computer and/or on his browser and/or, so that the user is more mobile, preferably on the chip card.

To prevent unauthorized reading of the keys temporarily stored on the computer or in the user's browser, they can be deleted from the browser or from the computer as soon as the user logs off the server's homepage or when the keys are no longer required.

The length of the keys used depends on the security desired or required and is between a few and several thousand bits in length. The longer the keys are, the more difficult it is to crack the keys.

It is naturally also possible to use other asymmetrical or else symmetrical encryption methods or combinations thereof. However, said public key method has the advantage that it is already widely used and recognized.

When encrypted communication has been set up, there preferably comes a next step in the registration process, which involves the user being asked to enter a user name and a password. If the details provided are not correct, an error message is displayed and the registration procedure is either terminated or the user is given another chance to enter the required data correctly.

If the details provided are correct, the procedure continues by reading the code from the database. As mentioned earlier, the code is read by the card program after both the user and the mediator program have correctly authenticated themselves with the security medium.

Authentication is preferably also required from the card program. However, the card program needs to authenticate itself directly on the database before it can read the next code. By way of example, the authentication can be hidden in the programming of the card program, or it is performed as in the case of authentication of the mediator program with the chip card using an authorization code. The card program can be of appropriately card-specific design, which means that the card program on a first chip card cannot be used to read the code from the database on a second chip card, since it cannot correctly authenticate itself with the database. Each chip card can more or less have an individual card program or individual authentication. If a card program does not correctly authenticate itself with the database, no access code is read and/or the database deletes itself or is deleted.

When the card program has transferred the code to the mediator program, the two steps below are preferably carried out in order to ensure that a code which has been read cannot be read from the database a second time and used again. Following receipt of the code from the card program, the mediator program acknowledges this to the card program, which then irrevocably deletes from the database the code which has been read.

In this context, however, the code transmitted to the data processing apparatus by the mediator program might not match the code which the data processing apparatus expects. This can happen if, by way of example, the communication channel has been interrupted during an earlier registration procedure precisely at the moment after the mediator program acknowledges receipt of the code but has not yet transmitted the code to the data processing apparatus. Upon the next registration procedure, a new code is then read from the database, with the previous code not yet having been deleted from the data processing apparatus's list and consequently still being shown there.

When the code is checked, the data processing apparatus thus inspects not just whether the code received matches the next code on its list, but also whether the code received matches one of the succeeding codes. If it finds this code, then it gives the user access.

The text below will describe an inventive arrangement for authenticating a user for access to confidential data or areas of a data processing apparatus, particularly a method like the one explained above. The arrangement comprises a security medium, first means for accessing the security medium, and second means for ascertaining user-specific identification features, such as biometric data for the user. The security medium, for example a chip card, has not only a processor but also a memory which stores a database having a plurality of codes and a program for accessing this database and also user-specific identification features for the user. In addition, the arrangement comprises third means for comparing the ascertained user-specific identification features with the user-specific identification features which have been detected in conjunction with the production of the security medium and have been stored on the security medium.

First of all, the first means allow access to the chip card, i.e. electronic communication with the processor and the reading of information stored in the memory, such as a code, from the database. By way of example, it is possible to use a "chip card reader" or another device, which can be connected to the computer used by the user for the purpose of data interchange and has appropriate electrical contact points which are used to set up the necessary connections when the chip card is inserted.

It is entirely possible for the third means for comparing the user information to be accommodated in an already existing device in the arrangement, for example in the computer or in the chip card reader or else in a separate device. Advantageously, however, the third means are integrated on the chip card itself, because this dispenses with reading and transmitting the information stored on the card. The user-specific information which have been detected when the chip card is produced and which are stored on said chip card thus remain on the chip card and never need to be read therefrom.

In addition, it is also possible for the second means, i.e. appropriate sensors or interfaces, such as optical sensors for determining the iris structure or a fingerprint from the user, acoustic sensors for determining the frequency spectrum of the user's voice or else other sensors and interfaces, such as a keyboard for entering a password, to be accommodated in an already existing device or in a separate device. Preferably, however, the second means are also integrated in the chip card. This has the advantage that the user-specific identification features ascertained are processed at that very location, i.e. can be compared with the user features stored in the chip card's memory and do not first need to be transmitted there.

In another preferred embodiment, the sensors are integrated in the chip card reader. As a result, although the user-specific identification features ascertained need to be transmitted to the chip card, this is not a problem because the chip card has been inserted in the chip card reader, and the chip card needs to be of less complex design.

As already mentioned, the communication between the user and the data processing apparatus is encrypted, by way of example, using an asymmetrical encryption method based on the public key method. So that the data processing apparatus also uses the correct keys, i.e. the user's keys, for encryption, it first needs to determine the identity of the user. Preferably, the chip card stores information corresponding to this for identifying the user, for example the user's public key, his electronic signature or other user information. This information is transmitted to the data processing apparatus, which analyzes it and infers the user's identity therefrom. The electronic signature could also be used to check the latter's validity at the same time, for example.

In another preferred embodiment of the inventive arrangement, the chip card has fourth means which can be used to delete the database in the chip card's memory. This is purely a precautionary measure and happens, by way of example, if the chip card establishes that the database is being accessed for misuse, or other discrepancies.

The detailed description below and the patent claims in their entirety reveal other advantageous embodiments and combinations of features of the invention.

These and other objects and advantages of the invention will be apparent from the following description, the accompanying drawings, and the appended claims.

BRIEF DESCRIPTION OF THE DRAWINGS

In the drawings used to explain the exemplary embodiment.

In principle, identical parts have been provided with identical references in the figures.

WAYS OF IMPLEMENTING THE INVENTION

The exemplary embodiment below describes the authentication of a user by a server on which, by way of example, a bank's Internet page is stored and which the user would like to access via the Internet and, by way of example, would like to view personal and hence confidential data such as his own account balances. However, the Internet is an open medium with no integrated encryption method or other security method. That is to say that a user who is not just interested in confidential communication but also wishes to ensure that only he can access his personal data needs to take appropriate measures. A similar situation naturally applies also to the server, which must allow no one other than the user himself to access his data.

Figure 1:
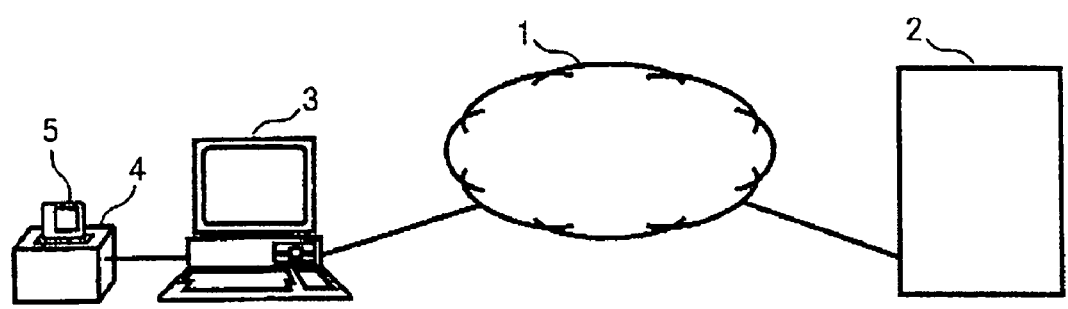
FIG. 1 shows an inventive arrangement for user authentication.

FIG. 1 shows the Internet 1, to which both the server 2 and the user's computer 3 are connected. It goes without saying that the two can also be connected to the Internet indirectly via an Internet Service Provider. Connected to the computer 3 is a reader 4 into which the user can insert his chip card 5.

Figure 2:
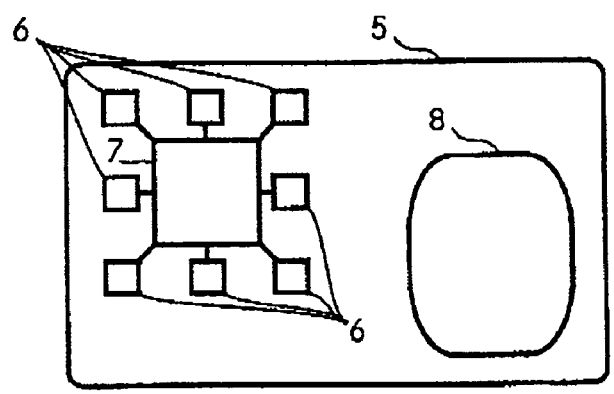
FIG. 2 shows a chip card for use in the arrangement shown in FIG. 1.

The reader 4 is able to communicate with the processor 7 on a chip card 5 which has been inserted into the reader 4 or to access the chip card's memory, which in this case is incorporated in the processor 7. As FIG. 2 shows, the chip card 5 has contact points 6 for this purpose which are connected to the processor 7 and via which, when the chip card 5 has been inserted, electrical connections between the processor 7 and the reader 4 or the computer 3 are set up with corresponding contact points in the reader 4. Naturally, contactless communication methods, such as radio or methods based on magnetic induction, are also suitable for the communication between the chip card 5 and the reader 4.

In addition, the chip card 5 has a sensor 8 which, in the exemplary embodiment chosen, is used to determine a fingerprint from the user. The user can place the finger in question onto the sensor 8 when the chip card has been inserted. Instead of incorporating the sensor 8 on the chip card 5, it is also possible to accommodate it in the reader 4, for example.

Figure 3:
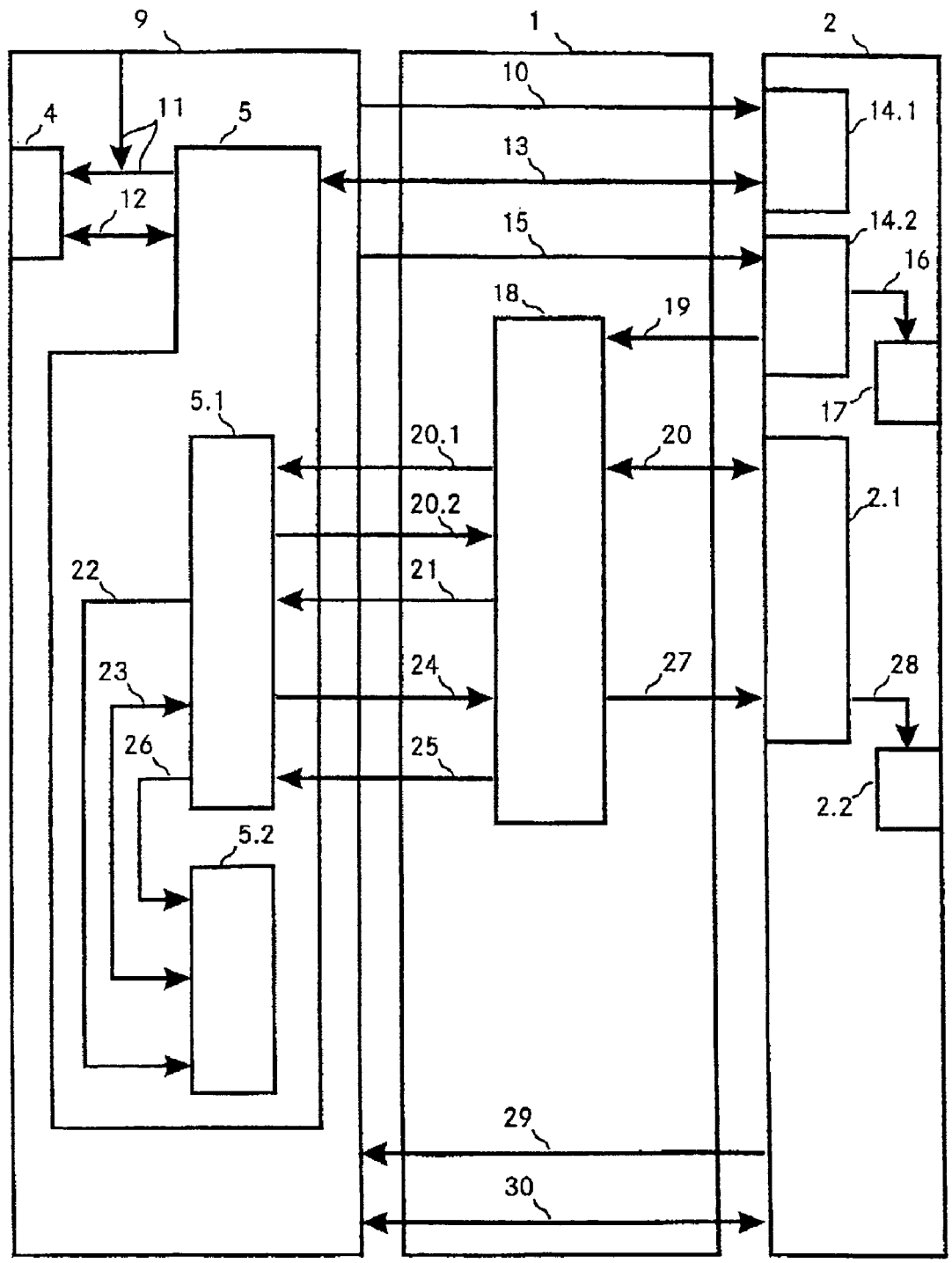
FIG. 3 shows a schematically illustrated flowchart of the inventive method for user authentication.

FIG. 3 schematically shows a chart of the method illustrating its procedure when the user registers on the bank's homepage. To open 10 the homepage, that is, when the access page 14.1 is opened 10, on the bank's server 2 via the Internet 1, the user 9 enters the appropriate URL address in his browser or clicks on a corresponding link, for example.

When the chip card 5 has been inserted 11 into the reader 4, the user 9 is authenticated 12 to the chip card 5 by placing his thumb or another finger on the sensor 8. This procedure can naturally also be explained and described to the user 9 on the access page 14.1 which has been selected. The chip card 5 checks the detected fingerprint and compares it with the user's fingerprint stored in the memory on the chip card 5, the term fingerprint being able to be understood to mean not just optical features, such as line arrangement, but also other features, such as distribution of heat. If the two fingerprints do not match, that is if authentication 12 of the user 9 to the chip card 5 has failed (not shown), the chip card 5 is not activated and no access code can be read from the database.

If the fingerprints match, on the other hand, the chip card 5 is activated and the registration procedure can be continued, which is done by clicking on a "Continue" button on the access page 14.1 displayed by the server 2, for example.

Next, encrypted communication is set up 13 between the server 2 and the user 9 or his computer or browser. For this, by way of example, the information stored on the chip card for identifying the user 9 is transmitted to the data processing apparatus, which can use this information to determine the user's identity and to provide the corresponding keys. From this time onward, the server 2 now communicates only in encrypted form with the user 9, the encryption being performed using a known asymmetrical or symmetrical encryption method.

When encrypted communication has been set up 13, the registration page 14.2 is opened in order for the user to be logged on 15. The user 9 is logged on 15 by virtue of the user 9 entering a user name and the associated password. This is followed by inspection 16 by the server 2 in a user database 17 which is accessible to the server 2 and is preferably stored on the server 2 itself, this involving the server 2 checking whether the user name entered matches the previously determined identity of the user. The server 2 also checks whether the user 9 has entered the correct password, that is, that associated with the user name.

If both the user name and the password are correct, the registration procedure is continued by starting 19 a program which, by way of example, is in the form of a Java program 18 and has been downloaded by the user 9 with the registration page 14.2.

Before the Java program 18 can become active, however, it needs to register 20.1 with the chip card 5, or to be more precise with a card program 5.1 stored thereon. To this end, the Java program 18 fetches an authorization code 20 from a server program 2.1 running on the server 2, for example. Correct registration 20.1 is followed by registration acknowledgement 20.2 by the card program 5.1, and the Java program 18 sends the card program 5.1 a request 21 for transmission of the next scratchlist code.

However, the card program 5.1 also first needs to authenticate itself to the card database 5.2, which is likewise stored on the chip card 5, before it can open the database. Once this authentication 22 has been completed correctly as well, the card program 5.1 can read 23 the next code for access authorization on the server 2 from the card database 5.2. After or at the same time as forwarding 24 of the access code which has been read to the Java program 18, the Java program sends the card program 5.1 acknowledgement 25 of correct receipt of the access code. When the card program 5.1 receives this acknowledgement 25, it deletes 26 from the card database 5.2 the access code which has just been read.

When the Java program 18 has acknowledged receipt of the access code to the card program 5.1, this access code is transmitted 27 to the server program 2.1. The server program initially checks 28 the access code. This involves the server program 2.1 inspecting whether the access code sent to it matches the next access code on the server's list, on the server database 2.2. If so, it grants the user 9 permission 29 to access 30 the desired data. Communication between the server 2 and the user 9 continues in encrypted form.

If the access code does not match the next code from the server database 2.2, the server program 2.1 checks further whether the access code matches one of the subsequent access codes from its server database 2.2. If it finds the access code at a later point in the server database 2.2, it likewise gives the user 9 permission 29 for the desired access 30. Typically, the server program 2.1 will then set its internal pointer, which respectively points to the next valid access code, to the successor to the transmitted access code and will delete all the access codes before that from its server database 2.2.

The inventive method can be used to stop virtually all conceivable attempts to access confidential data for the purpose of misuse. If, by way of example, the registration of a user is concurrently logged, the attacker acquires knowledge only of the encrypted, unique access code, which, even if it can be decrypted, cannot be used for a second registration procedure. Any attempt to read or to copy the chip card via the Internet when the user is currently on line, for example, also fails, because the chip card can be activated only after correct authentication by the correct user. Even an attack involving an attempt to access the user's chip card using a foreign card program, for example that from another chip card, can be deflected. This is because before the chip card enables access to the card database, the foreign card program needs to correctly authenticate itself directly on the card database. This can be done only by the correct card program, however, which is the only one to have the unique identification code required for this purpose.

Even if the card is lost or stolen, it is of no value to an attacker because he cannot activate it. Should he nevertheless succeed in doing this, for example because he has obtained a fingerprint from the user and can additionally feign the user's physical presence to the chip card, he will get no further, because he knows neither the user name nor the password for logging onto the server. Only if a potential attacker were also to obtain this information would it be possible to gain unauthorized access to the confidential data. However, the user ought to have noticed the loss of the chip card in the meantime and to have informed the appropriate offices of this, resulting in the chip card being immediately disabled.

In summary, it can be stated that the user authentication to the chip card and the individual card program for reading the access codes from the card database can provide dual protection for access to the card database and can effectively stop access to the access codes stored in the card database for the purpose of misuse. Since the access code list is generated at a secure location before storage on the chip card, and the corresponding algorithm cannot be discovered, none of the access codes still to come on the access code list can be calculated using the system. Furthermore, since access codes which have been read once are deleted from the card database before they are sent to the server, it is also not possible to reproduce the access codes even if the transmitted data are concurrently logged for a relatively long period.

The invention thus ensures that the user's identity can be checked with a level of security which has not been obtained up to now and that confidential data can be accessed only by the authorized user, who is the only person to have the necessary knowledge and means for activating the chip card at all. Even a targeted, professionally prepared attack will not be successful.

LIST OF REFERENCES

The following table lists various part numbers and corresponding parts:
1—Internet
2—Server
2.1—Server program
2.2—Server database
3—Computer
4—Reader
5—Chip card
5.1—Card program
5.2—Card database
6—Contact points
7—Processor
8—Sensor
9—User
10—Opening
11—Insertion
12—Authentication
13—Setup
14.1—Access side
14.2—Registration side
15—Logon
16—Inspection
17—User database
18—Java program
19—Start
20—Authorization code
20.1—Registration
20.2—Registration acknowledgement
21—Request
22—Authentication
23—Reading
24—Forwarding
25—Acknowledgement
26—Deletion
27—Transmission
28—Check
29—Permission
30—Access

The invention claimed is:

1. A method for authenticating a user for access to protected areas, where an access code is read from a database comprising a plurality of pre-calculated access codes that are stored on a security medium, particularly a chip card, and is transmitted to a data processing apparatus, wherein said method comprises the steps of:
  authenticating the user before the access code is read, starting a mediator program, particularly a Java program, a card program stored on the security medium is asked by the mediator program to read the access code, the mediator program is authenticated by the security medium, and, if the mediator program and the user have been correctly authenticated, the access code is read from the database by the card program, is transferred to the mediator program and is transmitted to the data processing apparatus by the mediator program, wherein after the mediator program is authenticated, the access code is read from the database by the card program, is then transferred to the mediator program and is then transmitted to said data processing apparatus, said access code being provided for each new connection that is extended between the user and the data processing apparatus.

2. The method according to claim 1, wherein the card program authenticates itself on the database, and the database does not read an access code and/or deletes itself or is deleted if the card program does not correctly authenticate itself.

3. The method according to claim 1, wherein the mediator program acknowledges receipt of the access code to the card program, and the card program deletes the access code from the database afterwards.

4. The method according to claim 1, wherein the user is authenticated by virtue of user-specific identification features, preferably biometric user data, being ascertained and these features being compared, particularly by the security medium, with user identification features stored on the security medium beforehand.

5. The method according to claim 1, wherein the data processing apparatus is accessed via a public communication network, where communication between the user and the data processing apparatus is encrypted and the encryption is performed using an asymmetric encryption method, particularly a public key method, and the user preferably inputs a user name and a password in order to access the data processing apparatus.

6. The method according to claim 1, wherein the data processing apparatus checks the access code transmitted by the mediator program, and the user is permitted to access the, particularly confidential, data or areas if the check was successful.

7. An arrangement for authenticating a user for access to protected areas, comprising a data processing apparatus for authenticating the user, a security medium and first means for accessing the security medium, the security medium having a processor and a memory, wherein the memory stores a database comprising a plurality of access codes that are pre-calculated, a program for accessing the database and user-specific identification features for a user, in that an access code can be read from the database exclusively by the program, and the security medium has means for authenticating a mediator program which asks the program to read the access code, in that the arrangement has second means for ascertaining user-specific identification features, preferably biometric user data, and the arrangement has third means for comparing the ascertained user-specific identification features with the user-specific identification features stored on the security medium, wherein after the mediator program is authenticated, the access code is read from the database by a card program, is then transferred to the mediator program and is then transmitted to said data processing apparatus, said access code being provided for each new connection that is extended between the user and the data processing apparatus.

8. The arrangement according to claim 7, wherein the second and third means are integrated in the security medium.

9. The arrangement according to claim 7, wherein the third means are integrated in the security medium and the second means are integrated in the first means.

10. The arrangement according to claim 7, wherein the memory stores information for identifying the user.

11. The arrangement according to claim 7, wherein the security medium has fourth means for deleting the database if it is accessed for misuse.

12. A security medium for authenticating a user for access to protected areas, comprising a processor and a memory, wherein the memory stores a database having a plurality of access codes that are pre-calculated, an individual program and user-specific identification features for a user, at least one of said plurality of access codes that are pre-calculated can be read from the database exclusively by the individual program, and the security medium has means for authenticating a mediator program which asks the individual program to read an access code, wherein after said mediator program is authenticated, at least one of said plurality of access codes is read from the database by said individual program and is then transferred to the mediator program, said at least one of said plurality of access code being provided for each new connection that is extended between the user and a data processing apparatus.

13. The security medium according to claim 12, wherein the security medium has means for determining user-specific identification features and also means for comparing the user-specific identification features stored in the memory with the determined identification features.

* * * * *